United States Patent
Foltz et al.

(10) Patent No.: US 12,084,314 B1
(45) Date of Patent: Sep. 10, 2024

(54) MODULAR UNMANNED LINE/TOOL EMPLACEMENT (MULE) HOOK

(71) Applicant: The United States of America as Represented by the Secretary of the Navy, Indian Head, MD (US)

(72) Inventors: Lee Foltz, Indian Head, MD (US); Adam Pegouske, White Plains, MD (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 18/445,533

(22) Filed: Sep. 29, 2023

Related U.S. Application Data

(63) Continuation of application No. 17/300,560, filed on Aug. 18, 2021, now Pat. No. 11,926,507.

(51) Int. Cl.
 *B66C 1/28* (2006.01)
 *B66C 1/34* (2006.01)

(52) U.S. Cl.
 CPC ...................... *B66C 1/28* (2013.01)

(58) Field of Classification Search
 CPC .... B66C 1/28; B66C 1/30; B66C 1/32; B66C 1/22
 USPC ............ 294/82.17, 82.13, 82.16, 82.19, 67.2
 See application file for complete search history.

(56) References Cited

U.S. PATENT DOCUMENTS

| | | | |
|---|---|---|---|
| 1,110,185 A | 9/1914 | Brown et al. | |
| 4,682,912 A * | 7/1987 | Henry | B66C 1/30 405/184.5 |
| 4,810,016 A * | 3/1989 | Greenhow | B66C 1/24 294/67.21 |
| 5,071,183 A * | 12/1991 | McDermott | E02F 3/968 294/81.5 |
| 5,613,721 A * | 3/1997 | Mullins | F41B 5/1465 294/217 |
| 8,434,801 B2 * | 5/2013 | LeBlanc | B66C 1/28 294/82.13 |
| 9,051,960 B2 | 6/2015 | Breeden et al. | |
| 10,111,545 B1 * | 10/2018 | Shapiro | B66C 1/28 |
| D847,619 S * | 5/2019 | Farahani | D8/367 |
| 11,002,308 B2 | 5/2021 | Chmelar | |
| 2007/0056147 A1 | 3/2007 | Tracy | |
| 2010/0117389 A1 * | 5/2010 | Poole | B66C 1/28 294/81.61 |
| 2010/0187844 A1 * | 7/2010 | Piinspanen | B66C 1/36 294/82.2 |
| 2011/0254302 A1 * | 10/2011 | Imlach | B66C 13/02 294/119 |

(Continued)

*Primary Examiner* — Paul T Chin
(74) *Attorney, Agent, or Firm* — Fredric J. Zimmerman

(57) ABSTRACT

A hook assembly includes a first hook having a first open end and a second hook having a second open end. The first hook is parallel to the second hook where the first open end is adjacent to the second open end. Extensions extend from each of the first hook and the second hook. The extensions extend perpendicular to a hook plane of the first hook and the second hook members. The first hook is a mirror image of the second hook. A hinge connects the first hook to the second hook. The hinge is located at an opposite end of the hook from where the extensions are located. A resilient member exerts a constant force at the hinge to bias the first hook and the second hook toward an open position.

16 Claims, 5 Drawing Sheets

(56) References Cited

U.S. PATENT DOCUMENTS

| | | | |
|---|---|---|---|
| 2012/0280521 A1* | 11/2012 | LeBlanc | B66C 1/34 294/67.2 |
| 2013/0264835 A1* | 10/2013 | LeBlanc | B66C 1/28 294/67.2 |
| 2019/0285110 A1 | 9/2019 | Garvey et al. | |

* cited by examiner

MODULAR UNMANNED LINE/TOOL EMPLACEMENT (MULE) HOOK

CROSS-REFERENCE TO RELATED APPLICATIONS

This application is a continuation of prior application Ser. No. 17/300,560, filed Aug. 18, 2021.

ORIGIN OF THE INVENTION

The invention described herein was made in the performance of official duties by employees of the U.S. Department of the Navy and may be manufactured, used, or licensed by or for the Government of the United States for any governmental purpose without payment of any royalties thereon.

BACKGROUND

Field of the Invention

The present invention relates to tools that are useful for riggers and the like, for connecting lines to objects, and, in particular, the present invention relates to hooks shaped for engaging a rod, bar or line.

Description of the Background

Hooks and hook assemblies are commonly used for attaching and securing various items together. In general, hook assemblies include a pair of attachment structures attached together by a strap, bungee cord, or the like.

Uses of single hooks have been around for millennia to attach a line or a tool to an object (post, tree, tube, etc.). This attachment is usually done using a person's hands. A single static hook or multiple static hooks have a tendency to slide or slip off the object requiring two hands to tie the hook onto the object. There is a need to enable one-handed operation or operation by unmanned platforms to attach, simply, a hook onto an object securely without the hook coming off.

SUMMARY

The inventive concept includes several features such as two, mirror-imaged hooks (one end open) of various shapes (round, rectangular, etc.) with an extension from each of the hooks extending perpendicular to the hook plane, such that both hooks, side-by-side, form a mirror pattern of each other. A hinge is used to couple the two hooks. The hinge is located at the opposite end of the hook from where the extensions are. A spring or other non-deforming member (spring, metal strip, rubber band, etc.) biases the two hooks apart. Tools or line/rope may be attached in various locations to either one or both hooks. The invention allows a one-handed person or an unmanned platform to hook an object and secure a tool or line to the object.

It is an object of the present invention to provide a device that may be engaged with a post or other object by one-handed operation. Another object is reduce the tendency for a hook to disengage from the post when a force, applied to the load through the hook, varies greatly and or goes to zero during use. A further object is to provide a hook that allows remote attachment using a one-handed operation or an unmanned platform to symmetrical or non-symmetrical objects to anchor a line or other types of tools. A still further object is to provide a hook that may be anchored to an object having closed ends that would prohibit placement from an open end, such as from the top of a post.

According to an aspect of the invention, a hook assembly includes a first hook having a first open end and a second hook having a second open end. The first hook is parallel to the second hook where the first open end is adjacent to the second open end. Extensions extend from each of the first hook and the second hook. The extensions extend perpendicular to a hook plane of the first hook and the second hook members. The first hook is a mirror image of the second hook. A hinge connects the first hook to the second hook. The hinge is located at an opposite end of the hook from where the extensions are located. A resilient member exerts a constant force at the hinge to bias the first hook and the second hook toward an open position.

According to another aspect of the invention, an exemplary apparatus includes first and second hook members. A hinge connects the first and second hook members along a first edge of the first and second hook members, such that the first hook member and the second hook member are configured to pivot with respect to each other into an open position. An extension extends perpendicular from each of the first and second hook members. The extension extends from a second edge of the first and second hook members opposite the hinge. A resilient member biases the hinge. The resilient member exerts a constant force onto the first and second hook members to maintain the first and second hook members in an open position.

According to an aspect of the invention, a latching device includes a first hook made up of a first U-shaped body having a first upper arm and a first lower arm. An end of the first upper arm is connected to an end of the first lower arm by a first base. The first U-shaped body has a first open end opposite the first base. A second hook is made up of a second U-shaped body having a second upper arm and a second lower arm. An end of the second upper arm is connected to an end of the second lower arm by a second base. The second U-shaped body has a second open end opposite the second base. The first hook is parallel to the second hook such that the first open end is adjacent the second open end. A hinge connects the first lower arm to the second lower arm. A resilient member biases the first hook away from the second hook. A first extension is connected to the first upper arm and extends perpendicular to the plane of the first hook. A second extension is connected to the second upper arm and extends perpendicular to the plane of the second hook.

DETAILED DESCRIPTION OF EXEMPLARY EMBODIMENTS

The Modular Unmanned Line/Tool Emplacement (MULE) hook concept comprises several features including two, mirror-imaged hooks (one end open) of various shapes (round, rectangular, etc.) with a extension from each of the hooks extending perpendicular to the hook plane, such that both hooks, side-by-side, form a mirror pattern of each other. A hinge is used to couple the two hooks. The hinge is located at the opposite end of the hook from where the extensions are located. A spring or other non-deforming member (metal strip, rubber band, etc.) biases the two hooks apart. Tools or line/rope may be attached in various locations to either one or both hooks.

Figure 1:
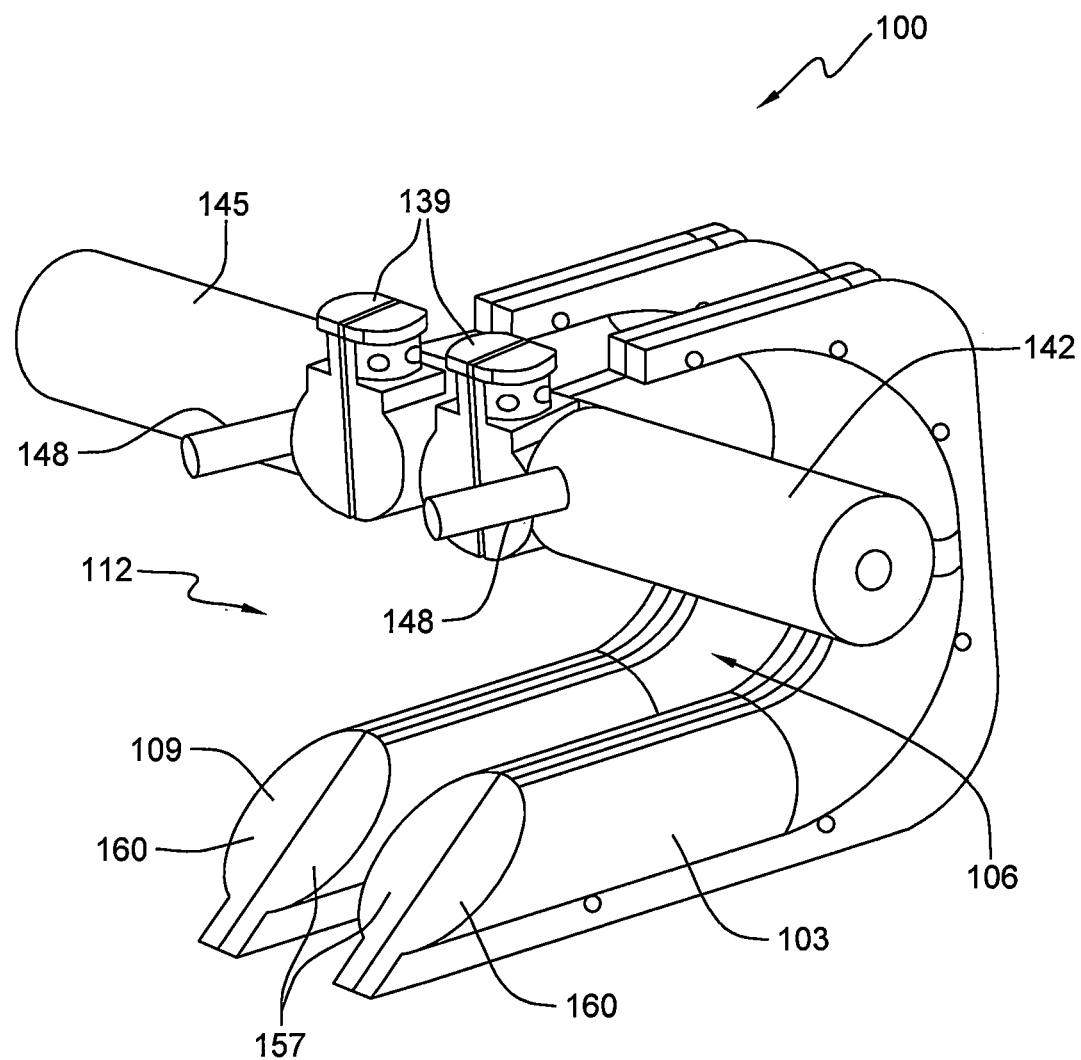
FIG. 1 is a perspective view of a Modular Unmanned Line/Tool Emplacement (MULE) hook, according to devices herein.
Figure 2:
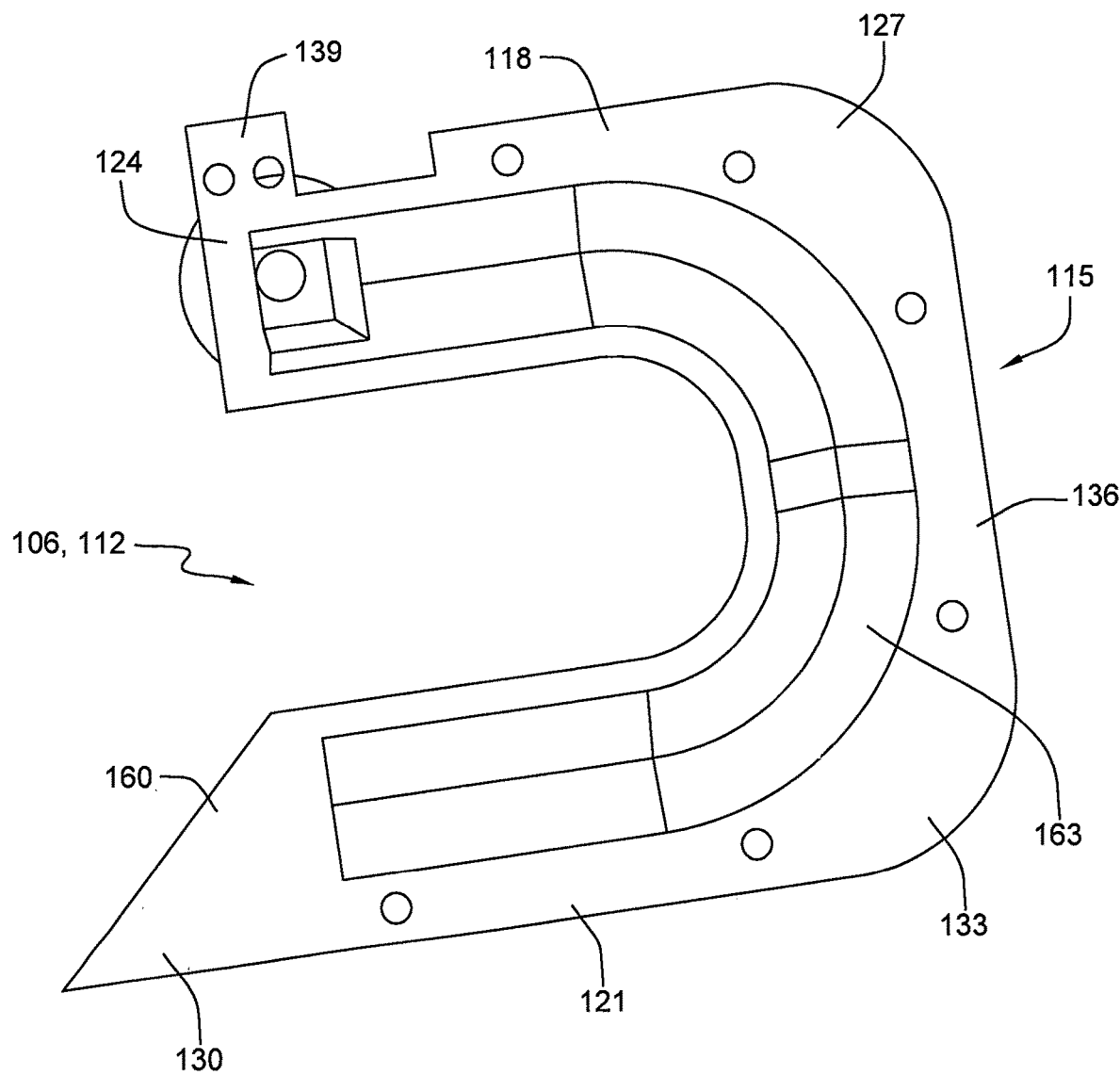
FIG. 2 is a side view of a hook, according to devices herein.

Referring to FIG. 1, a Modular Unmanned Line/Tool Emplacement (MULE) hook, indicated generally as 100, includes a first hook 103 having a first open end 106 and a second hook 109 having a second open end 112. As shown in FIG. 2, each of the first hook 103 and the second hook 109 includes a U-shaped body 115 having an upper arm 118 and a lower arm 121. The upper arm has a distal end 124 and a proximal end 127. Similarly, the lower arm has a distal end 130 and a proximal end 133. The proximal end 127 of the upper arm 118 and the proximal end 133 of the lower arm 121 are connected to a base 136. The first hook 103 and the second hook 109 may be of various sizes and shapes. The first hook 103 and the second hook 109 can be solid or hollow, depending on the intended use. Nubs 139 may be provided in the upper arm 118 for a robot gripper to conform, as further described below. The U-shaped body 115 of each of the first hook 103 and the second hook 109 has the first open end 106 of the first hook 103 and the second open end 112 of the second hook 109 opposite the base 136. Accordingly, the first open end 106 and the second open end 112 is defined between the distal end 124 of the upper arm 118 and the distal end 130 of the lower arm 121. Each of the first hook 103 and the second hook 109 defines a hook plane, and the hook plane of the first hook 103 is parallel to the hook plane of the second hook 109. In such a parallel configuration, the first open end 106 of the first hook 103 is adjacent to the second open end 112 of the second hook 109.

Referring again to FIG. 1, a first extension 142 is connected to the upper arm 118 of the first hook 103 and extends perpendicular to the hook plane of the first hook 103. A second extension 145 is connected to the upper arm 118 of the second hook 109 and extends perpendicular to the hook plane of the second hook 109. The first extension 142 extends in the opposite direction from the second extension 145 such that the first hook 103 is a mirror image of the second hook 109. In some exemplary embodiments, mirrored protrusions, such as 148, come out of the front or back of the extensions 142, 145. The mirrored protrusions 148 are located proximate the nubs 139, perpendicular to extensions 142, 145, and in plane with the respective hook plane of the first hook 103 or the second hook 109.

Figure 3:
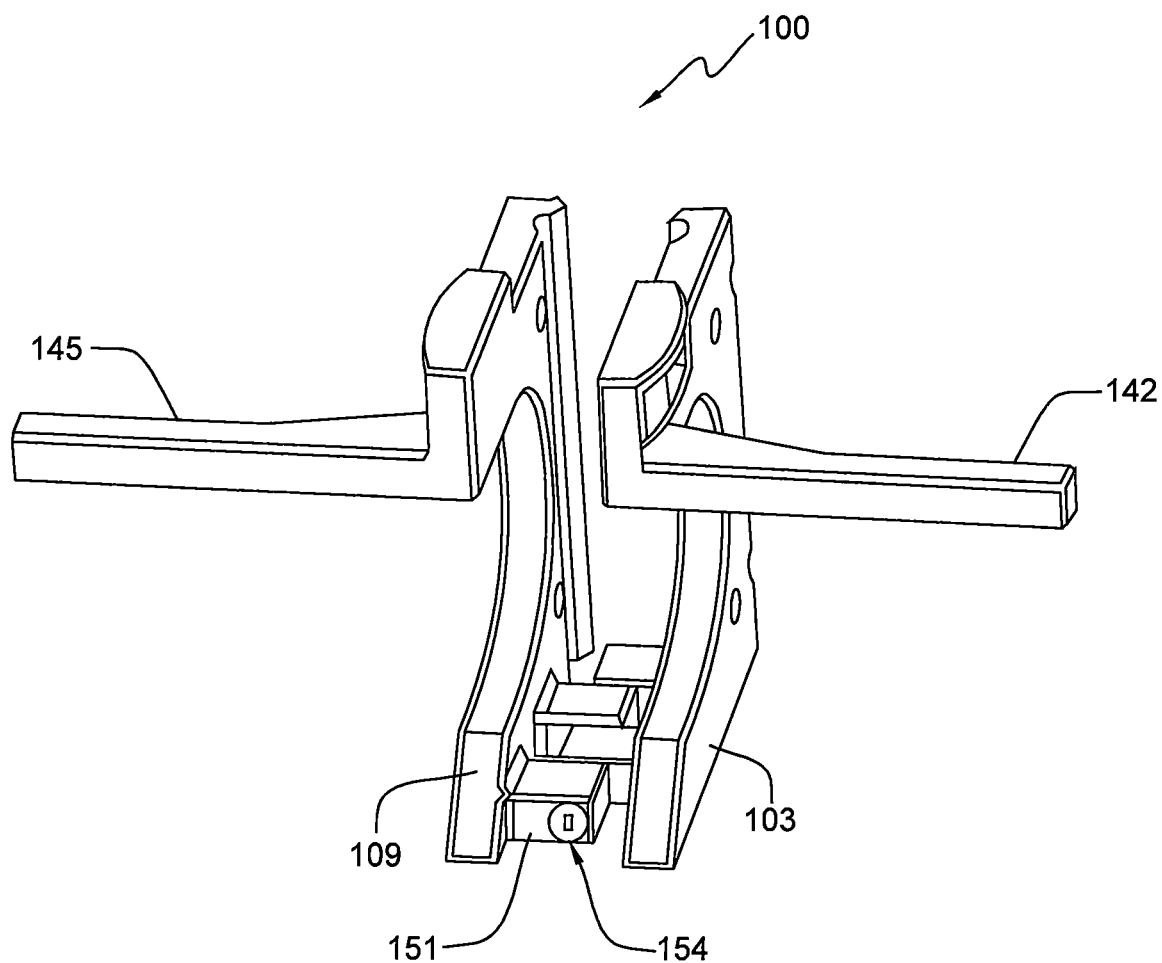
FIG. 3 is a front view of the hook of FIG. 1 in a closed position.
Figure 4:
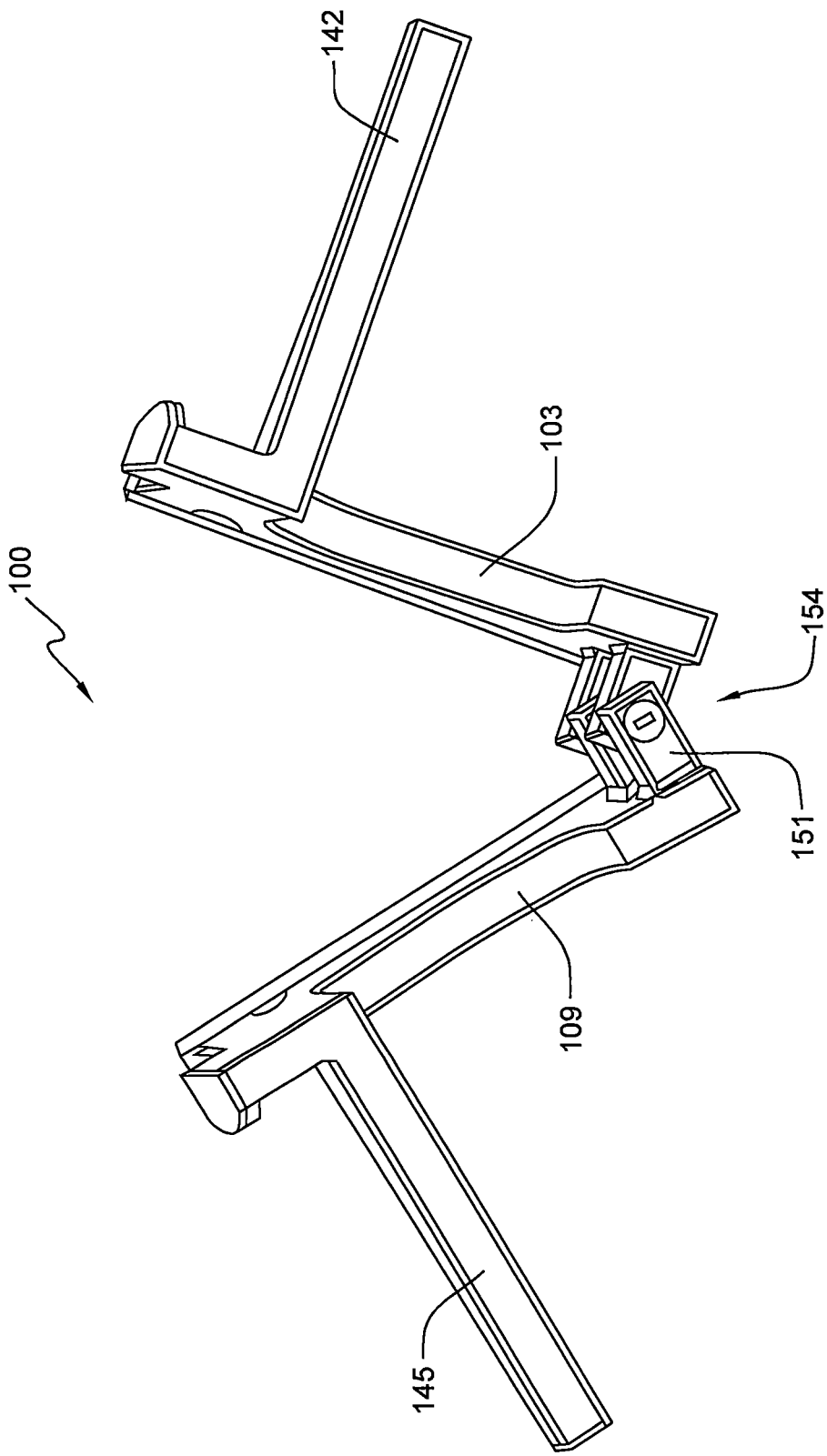
FIG. 4 is a front view of the hook of FIG. 1 in an open position.

Referring now to FIG. 3, a hinge 151 is attached to the lower arm 121 of the first hook 103 and the lower arm 21 of the second hook and connects the first lower arm to the second lower arm. In other words, the hinge 151 attaches the first hook 103 to the second hook 109. The hinge 151 is located at an opposite end of the hook from where the extensions 142, 145 are located. The first hook 103 and the second hook 109 are configured to pivot with respect to each other and the hinge 151 enables each of the first hook 103 and the second hook 109 to transition between a closed position, as shown in FIG. 3, and an open position, as shown in FIG. 4. A resilient member 154 is located at the hinge 151 and exerts a constant force at the hinge 151 to bias the first hook 103 and the second hook 109 toward the open position. The resilient member 154 can comprise a spring. Other resilient materials may be used, such as a metal strip, rubber band, etc.

The MULE hook 100 described herein may be made from a variety of materials (plastic, wood, carbon fiber, metal, etc.) depending on the application, holding strength needed, etc. For example, the MULE hook 100 can be made of a single material, such as metal wire, positioned over the object to attach, and the wire can be deformed to attach the MULE hook 100 to the object. It is contemplated that the MULE hook 100 can be manufactured of lightweight plastic and/or by 3D printing or other means now known or developed in the future. Some filaments that can be used for 3D printing include ABS (Acrylonitrile Butadiene Styrene) and Polylactic Acid, commonly known as PLA. When superior strength is needed, a carbon fiber-infused nylon filament may be used. Each material will have different properties resulting in insignificant differences in final print dimensions due to differing thermal properties.

In some embodiments, the MULE hook 100 can be hollow. That is, referring again to FIGS. 1 and 2, each of the first hook 103 and the second hook 109 can comprise an inner body half 157 and an outer body half 160. When mated, the inner body half 157 and outer body half 160 present a hollow cavity 163 therebetween. The hollow cavity 163 may be embedded with various materials to allow follow-on tasks. For example, the hollow cavity 163 may be filled with fluids, energetics, powders, etc. The inner body half 157 and outer body half 160 can be held together by any appropriate fastener, such as glue, wire, tie-wrap, zip-tie, etc.

Figure 5:
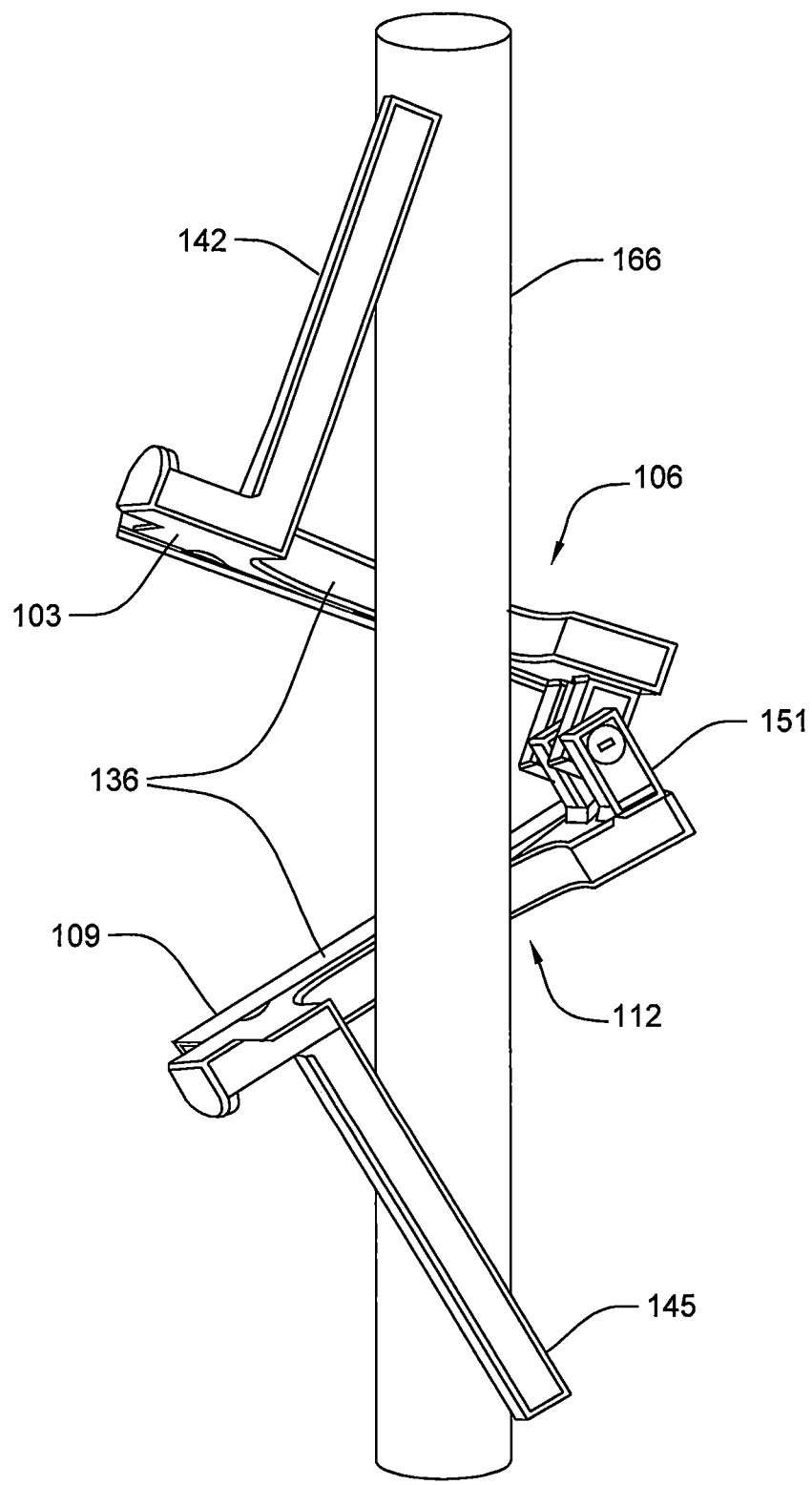
FIG. 5 shows the hook of FIG. 1 engaged on a post, according to devices herein.

The MULE hook 100 may be applied to a variety of categories such as attachment of devices onto human limbs, trees, piers, structures, etc. Referring now to FIG. 5, which shows operation of the MULE hook 100. With the first hook 103 and the second hook 109 in the closed position (FIG. 3), the first open end 106 of the first hook 103 and the second open end 112 of the second hook 109 are presented to the object 166 to be attached to, such as post 166. The first hook 103 and the second hook 109 can be maintained in the closed position by holding the base 136 of each of the first hook 103 and the second hook 109 adjacent to each other. When the base 136 is released, the resilient member 154 in the hinge 151 shifts the first hook 103 and the second hook 109 to the open position. In the open position, the extensions 142, 145 are located on one side of the post 166 and the base 136 of each of the first hook 103 and the second hook 109 is located on the opposite side of the post 166. The MULE hook 100 is maintained in place by the force of the resilient member 154 biasing the first hook 103 and the second hook 109 to the open position. Post 166 can be any round, tubular, non-symmetrical object, such as trees, pipe, lines, structures, etc. Tools or line/rope may be attached to the MULE hook 100 at the area of the hinge 151 or in other appropriate locations. The device allows a one-handed person or unmanned platform to hook an object and secure a tool or line to the object.

For an unmanned system, such as a robot with or without an arm, grippers may be used to grasp the MULE hook 100 along the upper arm 118 using the nubs 139. The nubs 139 in the upper arm 118 may be shaped for the robot gripper to conform thereto. For cases without an unmanned platform, the MULE hook 100 may be released using the mirrored protrusions 148 coming out of extensions 142, 145. When this occurs, a pipe or other elongate object can be used to set the mirrored protrusions 148 inside the pipe. The MULE hook 100 can be hooked onto the post 166 or other object with the pipe being pulled away from the post 166 or other object releasing the two mirrored protrusions 148 and allowing the force of the resilient member 154 to open the MULE hook 100.

The invention has been described with references to specific embodiments. While particular values, relationships, materials, and steps have been set forth for purposes of describing concepts of the invention, it will be appreciated by persons skilled in the art that numerous variations and/or modifications may be made to the invention as shown in the disclosed embodiments without departing from the spirit or scope of the basic concepts and operating principles of the invention as broadly described. It should be recognized that, in the light of the above teachings, those skilled in the art could modify those specifics without departing from the invention taught herein. Having now fully set forth certain exemplary embodiments and modifications of the concept underlying the present invention, various other embodiments as well as potential variations and modifications of the embodiments shown and described herein will obviously occur to those skilled in the art upon becoming familiar with such underlying concept. It is intended to include all such modifications, alternatives, and other embodiments insofar as they come within the scope of the appended claims or equivalents thereof. It should be understood, therefore, that the invention might be practiced otherwise than as specifically set forth herein. Consequently, the present exemplary embodiments are to be considered in all respects as illustrative and not restrictive.

The terminology used herein is for the purpose of describing particular systems and methods only and is not intended to be limiting of this disclosure. As used herein, the singular forms "a", "an", and "the" are intended to include the plural forms as well, unless the context clearly indicates otherwise. It will be further understood that the terms "comprises", "comprising", "includes", and/or "including", when used in this specification, specify the presence of stated features, integers, steps, operations, elements, and/or components, but do not preclude the presence or addition of one or more other features, integers, steps, operations, elements, components, and/or groups thereof. Further, the terms "automated" or "automatically" mean that once a process is started (by a machine or a user), one or more machines perform the process without further input from any user.

The corresponding structures, materials, acts, and equivalents of all means or step plus function elements in the claims below are intended to include any structure, material, or act for performing the function in combination with other claimed elements as specifically claimed. The descriptions of the various embodiments herein have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

For example, terms such as "right", "left", "vertical", "horizontal", "top", "bottom", "upper", "lower", "under", "below", "underlying", "over", "overlying", "parallel", "perpendicular", etc., as used herein, are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements).

Finally, any numerical parameters set forth in the specification and attached claims are approximations (for example, by using the term "about") that may vary depending upon the desired properties sought to be obtained by the present invention. At the very least, and not as an attempt to limit the application of the doctrine of equivalents to the scope of the claims, each numerical parameter should at least be construed in light of the number of significant digits and by applying ordinary rounding.

What is claimed is:

1. A hook assembly, comprising:
    a first hook comprising a first body having a first upper arm and a first lower arm, the first upper arm includes a first open end;
    a second hook comprising a second body having a second upper arm and a second lower arm, the second upper arm includes a second open end, wherein said first hook is parallel to said second hook, and wherein said first open end is adjacent to said second open end;
    extensions extending from each of said first hook and said second hook, wherein said extensions extends perpendicular to a hook plane of said first hook and said second hook;
    a hinge connecting said first hook and said second hook, said hinge is located opposite said extensions; and
    a resilient member exerting a constant force at said hinge for biasing said first hook and said second hook toward an open position,
        wherein the first hook and the second hook are configured to pivot with respect to each other.

2. The hook assembly according to claim 1, wherein said hinge enables each of said first hook and said second hook to transition between an open position and a closed position.

3. The hook assembly according to claim 1, wherein each of said first hook and said second hook is hollow.

4. The hook assembly according to claim 3, wherein each of said first hook and said second hook comprises an inner body half and an outer body half presenting a cavity there between.

5. The hook assembly according to claim 3, wherein each of said first hook and said second hook comprises an inner body half and an outer body half presenting a cavity therebetween, and wherein said cavity is filled with an energetic.

6. The hook assembly according to claim 1, wherein said resilient member comprises a spring.

7. The hook assembly according to claim 1, wherein said first hook is a mirror image of said second hook.

8. The hook assembly according to claim 1, where the first body is a first U-shaped body, and wherein the second body is a second U-shaped body.

9. An apparatus, comprising:
    first and second hook members;
    a hinge connecting said first and second hook members along an edge of said first and second hook members, wherein said first hook member and said second hook member are configured to pivot with respect to each other between an open position and a closed position;
    an extension extending perpendicular from each of said first and second hook members, said extension is situated from an edge of said first and second hook members opposite said hinge; and
    a resilient member biasing said hinge, said resilient member exerts a constant force onto said first and second hook members to maintain said first and second hook members in an open position;

wherein said first and second hook members are hollow, and wherein each of said first and second hook members comprises an inner body half and an outer body half presenting a cavity there between.

10. The apparatus according to claim 9, wherein said hinge enables said first and second hook members to transition between an open position and a closed position.

11. The apparatus according to claim 9, wherein said cavity is filled with an energetic.

12. The apparatus according to claim 9, wherein said resilient member comprises a spring.

13. The apparatus according to claim 9, wherein said first and second hook members are mirror images of each other.

14. A latching device system, comprising: a first hook comprising a first body having a first upper arm and a first lower arm, the first upper arm including a first open end; a second hook comprising a second body having a second upper arm and a second lower arm, the second upper arm including a second open end, wherein said first hook is parallel to said second hook, and wherein said first open end is adjacent to said second open end; extensions extending from each of said first hook and said second hook, wherein said extensions extending perpendicular to a hook plane of said first hook and said second hook; a hinge connecting said first hook and said second hook, said hinge is located opposite said extensions; a resilient member exerting a constant force at said hinge for biasing said first hook and said second hook toward an open position; and an object being situated substantially adjacent the first hook and the second hook, wherein the first hook and the second hook are configured to pivot with respect to each other, and wherein the first open end and the second open end are presented to the object for attachment.

15. The lacking device system according to claim 14, wherein the object is a post structure.

16. The lacking device system according to claim 14, wherein the object includes a longitudinal axis.

* * * * *